United States Patent
Canady et al.

(10) Patent No.: US 6,385,665 B1
(45) Date of Patent: May 7, 2002

(54) SYSTEM AND METHOD FOR MANAGING FAULTS IN A DATA TRANSMISSION SYSTEM

(75) Inventors: Kevin E. Canady, Garland; Byron T. Butterfield; Dwight W. Doss, both of Richardson; Dennis C. Dupont, Plano; Mark C. Tindall, Allen; Richard S. Weldon, Jr., Plano, all of TX (US)

(73) Assignee: Alcatel USA Sourcing, L.P., Plano, TX (US)

( * ) Notice: Subject to any disclaimer, the term of this patent is extended or adjusted under 35 U.S.C. 154(b) by 0 days.

(21) Appl. No.: 09/216,568

(22) Filed: Dec. 18, 1998

(51) Int. Cl.[7] .............................. G06F 3/00; H02H 3/05; H03K 19/003; H04B 1/74
(52) U.S. Cl. .............................. 710/2; 714/47; 714/48; 714/49
(58) Field of Search .............................. 714/4, 7, 8, 39, 714/45, 49, 57, 47, 48; 710/2

(56) References Cited

U.S. PATENT DOCUMENTS

| | | | | |
|---|---|---|---|---|
| 4,554,661 A | * | 11/1985 | Bannister | 714/45 |
| 4,633,467 A | * | 12/1986 | Abel et al. | 714/45 |
| 4,727,548 A | * | 2/1988 | Dickey | 714/803 |
| 4,745,593 A | * | 5/1988 | Stewart | 370/244 |
| 4,979,174 A | * | 12/1990 | Cheng et al. | 714/774 |
| 5,157,667 A | * | 10/1992 | Carusone, Jr. et al. | 714/45 |
| 5,226,150 A | * | 7/1993 | Callander et al. | 714/57 |
| 5,383,201 A | * | 1/1995 | Satterlee et al. | 714/4 |
| 5,394,407 A | * | 2/1995 | Coddington | 714/752 |
| 5,448,725 A | * | 9/1995 | Gervais | 714/47 |
| 5,740,357 A | * | 4/1998 | Gardiner et al. | 714/57 |
| 5,790,779 A | * | 8/1998 | Ben-Natan et al. | 714/39 |
| 5,864,686 A | * | 1/1999 | Kaiser et al. | 395/308 |
| 5,881,069 A | * | 3/1999 | Cannon et al. | 714/748 |
| 5,968,189 A | * | 10/1999 | Desnoyers et al. | 714/47 |
| 5,978,938 A | * | 11/1999 | Kaiser et al. | 714/48 |
| 6,070,072 A | * | 5/2000 | Dorenbosch et al. | 455/423 |

FOREIGN PATENT DOCUMENTS

JP          404168547 A   *  6/1992

* cited by examiner

Primary Examiner—Thomas Lee
Assistant Examiner—Chun Cao
(74) Attorney, Agent, or Firm—Baker Botts L.L.P.

(57) ABSTRACT

A system and method for managing faults in a data transmission system that includes a data path for transmitting signals containing data, and a plurality of application cards located along the data path for processing the signals. The method includes the steps of detecting the occurrence of a fault of a particular type at one of a plurality of points along the data transmission path; in response, the application card generating a fault report for the purpose of identifying the cause of the detected fault; and, preventing the generation by the application card of subsequent fault reports relating to that particular type of fault until receiving a signal indicating that fault report generation may be reenabled. In the fault management system, the data transmission system also includes at least one unit controller for controlling the application cards, and at least one system manager for controlling the at least one unit controller. The system further includes application card software residing on the plurality of application cards, unit controller software residing on the at least one unit controller, and system manager software residing on the at least one system manager. The application card software is capable of generating a first fault report in response to detecting that a first fault of a particular type has occurred in the data transmission system, and suppressing the generation of subsequent fault reports relating to that particular type of fault until receiving a signal indicating that fault report generation may be reenabled.

18 Claims, 3 Drawing Sheets

SYSTEM AND METHOD FOR MANAGING FAULTS IN A DATA TRANSMISSION SYSTEM

TECHNICAL FIELD OF THE INVENTION

The present invention relates in general to the field of telecommunications switching equipment. More particularly, the invention relates to a system and method for managing faults in a data transmission system.

BACKGROUND OF THE INVENTION

In any type of data transmission system, the ability to reliably transmit data without interruption is of the utmost importance. Data transmission, however, is always subject to error or faults due to signal integrity problems and/or failure of the physical devices or elements that form the data transmission path. To address these inevitable faults, most data transmission systems will include a subsystem or process by which data and device faults are detected and corrected. Such "fault management" systems are intended to locate and correct system faults in the most efficient manner so that service disruptions are minimized Adequate fault management systems must not only be able to detect faults, but also to determine the cause of the fault in order to ensure that the same type of fault does not continue to occur, and also to ensure that it does not cause other types of faults to subsequently occur. To do this the fault must be "isolated" so that the physical device or element responsible for causing the fault can be identified, and the proper steps taken to ensure that the faulty device is repaired and returned to operation. Fault isolation is often achieved by providing fault detection at various points along the data transmission path. For example, if data passes through three separate processing circuits, each of which are coupled together by separate communication links, fault detection may be provided at each of the three circuits, or may even be provided at multiple points along each of the three circuits. In this manner, when a fault is detected the system can readily determine which circuit or communication link is faulty.

In known fault management systems, each time a fault is detected anywhere in the data transmission system a fault report identifying the fault is generated and forwarded to a centralized fault management node. This central node will then attempt to isolate the fault, and perform the steps necessary to correct the problem. Thus, every fault that is detected is reported, and is individually addressed by this centralized fault management node.

Individually addressing each and every fault, however, is inefficient and has many drawbacks that adversely affect system performance. The system is inefficient because not all faults need to be reported and addressed. Often times a single initial fault will spawn many subsequent faults, but if the underlying fault is isolated and corrected, the subsequently spawned faults will correct themselves. For example, a timing fault caused by a defective timing circuit may appear as a data integrity fault at various places along the data transmission path, and be detected as such at each of these places. Thus, one timing fault leads to multiple subsequent faults. Of each of these detected faults, however, only the very first generated fault report is helpful in isolating and correcting the source of the problem. It is only the initial fault that is critical to isolate and address, and once corrected the subsequent resulting faults will be eliminated automatically. Thus, under many circumstances, subsequent fault reports are superfluous, and the processing of these superfluous reports utilizes resources of the fault management system that could be better used on addressing more urgent or more critical fault reports. Accordingly, known fault management systems unnecessarily address each and every fault, and therefore, do not provide the most effective manner by which to manage faults.

SUMMARY OF THE INVENTION

Accordingly, a need currently exists for a method for managing faults in a data transmission system that is more efficient in managing faults, and that reduces the burden on the fault management system of addressing each fault that is detected.

In accordance with the present invention, a system and method for managing faults is provided in a data transmission system having a data path for transmitting signals containing data, and a plurality of application cards along the data path for processing the signals. The method includes the steps of detecting the occurrence of a first fault of a particular type by one of the application cards, and in response to detecting this fault, generating a fault report for the purpose of identifying the cause of the fault. Next, the generation of subsequent fault reports by the application card that relate to that particular type of fault are prevented until a signal is received that indicates that fault report generation may be reenabled. Subsequent steps may include receiving this signal and reenabling fault report generation, and generating a subsequent fault report in response to detecting a subsequent fault of that particular type. Further steps may also include in response to detecting the first fault of the particular type, setting a fault status indicator associated with the application card that represents the particular fault type, and in response to receiving the signal indicating that fault report generation may be reenabled, clearing the fault status indicator.

In an alternate embodiment of the present invention, the method includes detecting the occurrence of a first fault of a particular type by one of the plurality of application cards and determining a priority level of the detected fault in response to its detection. The application card generates a fault report for the purpose of identifying the cause of the detected fault. Subsequently, the application card prevents the generation of subsequent fault reports relating to faults of the determined priority level and lower until receiving a signal indicating that fault report generation may be reenabled. Subsequent steps may include receiving this signal and reenabling fault report generation, and generating a subsequent fault report in response to detecting a subsequent fault of the determined priority level or lower. Further steps may also include in response to detecting the first fault of the particular type, setting a fault status indicator associated with the application card that represents the particular fault type, and in response to receiving the signal indicating that fault report generation may be reenabled, clearing the fault status indicator.

In another embodiment according to the present invention, a fault management system for managing faults in a data transmission system is provided, where the data transmission system includes a data transmission path for transmitting signals containing data, a plurality of application cards along the data path for processing the signals, at least one unit controller for controlling the application cards, and at least one system manager for controlling the at least one unit controller. The system includes application card software residing on the plurality of application cards, unit controller software residing on the at least one unit controller, and system manager software residing on the at least one system manager. The application card software is capable of generating a first fault report in response to detecting that a first fault of a particular type has occurred in the data transmission system, and also of suppressing the generation of subsequent fault reports relating to faults of that particular type until receiving a signal indicating that fault report generation may be reenabled. In one embodiment the fault report is sent to a fault management subroutine within the unit controller software, and the signal indicating that fault report generation may be reenabled is received from the fault manager. In an alternate embodiment the fault report is sent to a fault management subroutine within the system manager software, and the signal indicating that fault report generation is to be reenabled is received from the fault manager.

BRIEF DESCRIPTION OF THE DRAWINGS

For a more complete understanding of the present invention and the advantages thereof, reference is now made to the following description taken in conjunction with the accompanying drawings in which like reference numbers indicate like features wherein.

DETAILED DESCRIPTION OF THE INVENTION

The fault management system and method of the present invention can be implemented in any type of data transmission system. A particularly suitable application is in a telecommunication switching system where data integrity and reliable transmission are particularly important. Although the present invention will be described below in relation to a telecommunications switching system, it is to be understood that the invention is not so limited.

Figure 1:
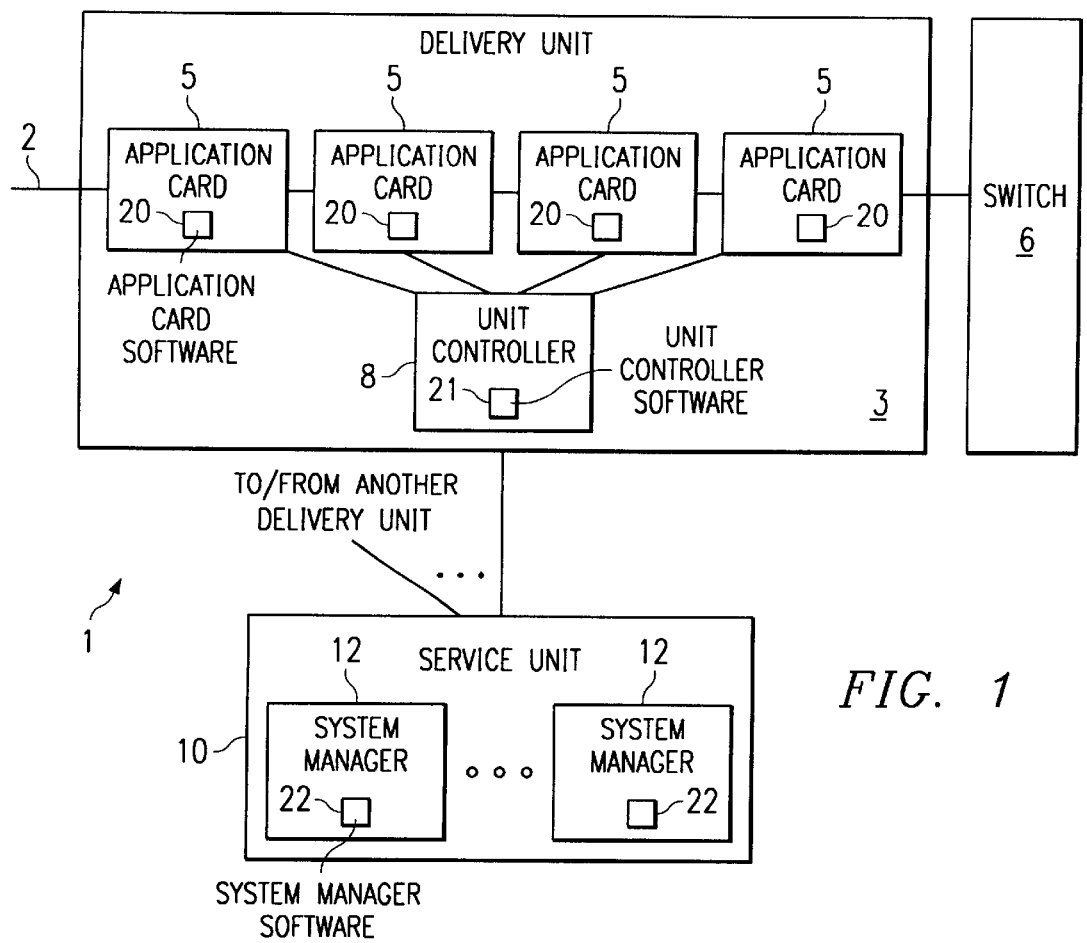
FIG. 1 is a system block diagram of an embodiment of a telecommunications switching system in which the fault management system and method of the present invention may be employed.

Referring now to FIG. 1, in an exemplary telecommunications switching system 1, telecommunications signals, such as digitally encoded optical telecommunications data, are transmitted over a conductor, such as an optical conductor 2. These signals are received by a delivery unit 3 and are processed by a series of different application cards 5 that each contain application circuitry that contributes to converting the optical signals into electrical signals and further processing these signals. The electrical signals are then transmitted to a switch 6 for switching the electrical signals. The various application circuits on application cards 5 may include optical terminator circuits that receive and convert the optical signals into electrical signals, and various other circuits that receive and terminate those electrical signals and perform the necessary multiplexing and demultiplexing to the appropriate signal levels for switching by switch 6. The series of application cards 5 that form the data transmission path between the incoming optical signals and switch 6 constitute a "shelf". Although only one shelf is shown in FIG. 1, there may be multiple shelves within delivery unit 3, each being controlled and managed by a unit controller 8.

Unit controller 8 provides administration and maintenance for application cards 5 within delivery unit 3 by sending control data to and receiving status information from application cards 5. A service unit 10 is coupled to delivery unit 3 and includes one or more system managers 12. System manager 12 provides centralized control, administration operations, and maintenance for delivery unit 3. Although only one delivery unit is shown in FIG. 1, the telecommunications switching system many include multiple delivery units, each under the common control of service unit 10.

In addition to the hardware elements described above, delivery unit 3 also includes software necessary to multiplex and demultiplex optical signals to the appropriate signal levels, and to interface these signals to switch 6. In particular, unit controller 8 and service unit 10 include unit controller software 21 and system manager software 22 respectively, that is necessary to the control, administration and maintenance functions that these devices perform. Further, application card software 20 residing on application cards 5, together with the unit controller software, and the system manager software form part of the fault management system, that will be described below. In an exemplary embodiment, the software is composed of software building blocks in an object oriented programming environment. Each building block is a software product comprised of objects that interface with other building blocks.

Figure 2:
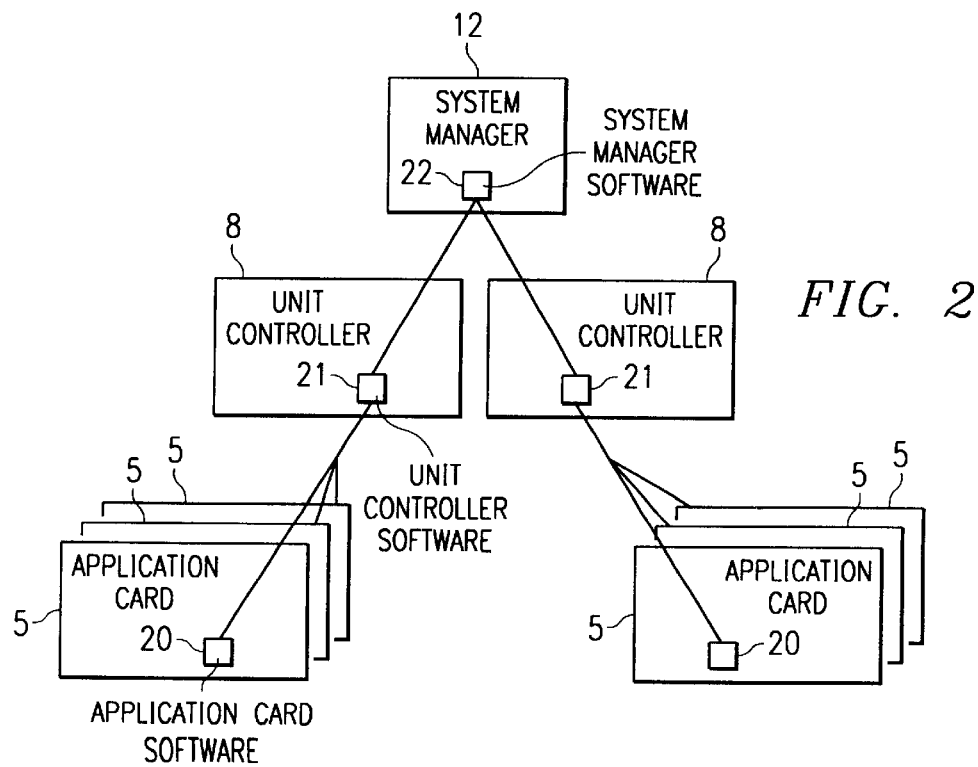
FIG. 2 is a block diagram illustrating the software control hierarchy in an exemplary embodiment of a fault management system.

FIG. 2 illustrates the software management and control hierarchy for an exemplary telecommunication switching system in which the system and method of the present invention may be employed. At the bottom of the hierarchy is application card software 20. Software at this level communicates to product specific interfaces, such as the individual application circuits. Unit controller software 21 that is associated with unit controller 8, manages the application cards, and provides the maintenance and administration functions for these application cards. Finally, system manager software 22 in system manager 12 of service unit 10 provides centralized control and administration over delivery units 3.

The fault management system and method of the present invention occupies all architectural layers, and is primarily divided into two major building blocks, Fault Detection, and Fault Managing. According to one embodiment the Fault Management building block includes a Fault Routing subroutine.

Figure 3:
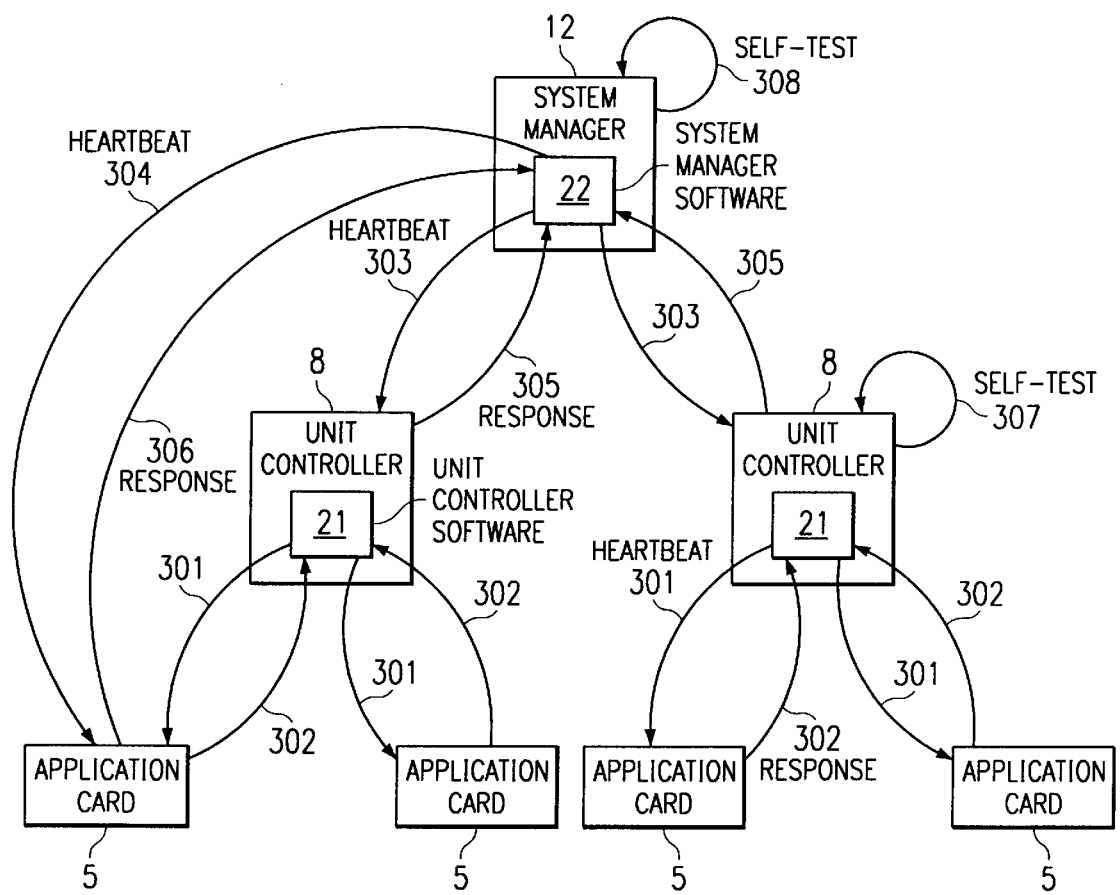
FIG. 3 is a block diagram illustrating the interaction between software building blocks in one embodiment a the fault management system.

The Fault Detection building block provides constant monitor tests, or "heartbeat" tests, at service unit 10 and unit controller 8 layers. As shown in FIG. 3, Fault Detection on unit controller 8 periodically sends out heartbeat tests 301 to selected application cards 5. If the application cards are operating properly, each will return an acknowledgment response 302. If an expected acknowledgment response is not received, Fault Detection may issue a fault report reporting on the malfunctioning application card 5 (see FIG. 4). Similarly, the Fault Detection on system manager 12 will periodically conduct heartbeat tests 303 and 304 on unit controllers 8 and on selected application cards 5. The unit controllers and application cards receiving the heartbeat messages will likewise acknowledge the message 305, 306 to indicate that they are functioning properly. Otherwise, a fault report may be issued by the Fault Detection building block that did not receive the expected acknowledgment. Fault Detection at the unit controller and system manager layers also periodically conduct self-tests, as indicated by 307 and 308 in FIG. 3. These self-tests may include, for example, memory integrity tests, I/O module functionality tests, and processor status tests.

In addition to the fault reports that may be generated in response to the heartbeat and self-tests initiated by the Fault Detection building block, application cards 5 and unit controllers 8 may also issue various fault reports themselves that are not prompted by Fault Detection, but are nevertheless received and managed by the fault management system. In one embodiment, application cards 5 are each capable of detecting device faults, timing faults, and/or path faults. Device faults include those faults that can be directly attributed to the failure of a device, and timing faults are faults that result from a failure of the timing network. Finally, path faults are faults that result from erroneous and degraded connections in the signal data paths of the telecommunications switching system. Path faults may include parity errors, cyclical redundancy errors, and path verification errors. These types of faults may be detected at various points along the data transmission path, as was described above, and by any of various means that are well known in the art. For example, the appropriate means may be employed so that these types of faults are detected at two points along each application card in the data transmission path, such as at both the receiving end and at the transmitting end of the card.

Figure 4:
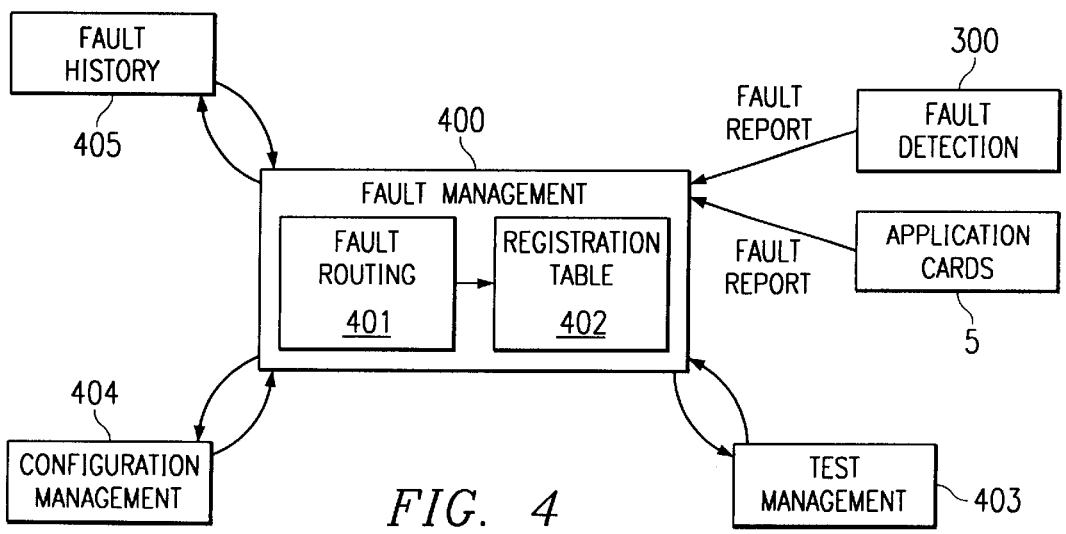
FIG. 4 is a block diagram illustrating the interaction of the Fault Management software building block with other building blocks.

The fault reports referred to above include the data and information necessary to allow the Fault Management building block to assess and isolate the detected fault, and to take the steps necessary to correct the problem. Information such as the time of the event, the fault type, the identification of the failed device, the identification of the component where the failed device resides, the identification of the fault detector, the priority of the fault (described below), and the destination of the fault report may all be included within the fault report. As shown in FIG. 4, fault reports that are issued by application cards 5 or by Fault Detection 300 are forwarded to Fault Management 400, which occupies both the system manager and unit controller architectural layers. In one embodiment of the invention, when a fault report is issued by unit controller 8, application card 5, or by Fault Detection, the destination is specified as the Fault Management building block in next higher architectural layer; and the destination of a fault report issued at the system manager layer is the Fault Management building block in the same architectural layer.

In an alternate embodiment, however, a Fault Routing 401 subroutine may be included within the Fault Management 400 building block, which allows any building block in the same architectural layer, or any building block in a higher architectural layer to register to receive fault reports generated by specified devices. In this alternate embodiment, fault reports are received by Fault Routing 401, and if a destination is not designated in the fault report, Fault Reporting will consult a registration table 402 to determine if any building block has registered to receive that unit's fault reports. If so, the fault report will be routed to the destination specified in the registration table. Otherwise, the a default destination will be assigned, such as that described above.

As indicated above, in one embodiment fault reports are sent to Fault Management at either the unit controller 8 layer or the system manager 12 layer. Once Fault Management 400 receives a fault report it attempts to isolate the cause of the fault to a particular device, then removes the faulty device from service, and later returns the device to service when the problem has been corrected. At both the system manager and the unit controller level, Fault Management interfaces with several other building blocks to accomplish these tasks. As shown in FIG. 4, Fault Management 400 may interface with a test management building block 403 to make test requests to gather information for the purpose of isolating the faulty device. It may also interface with a configuration management building block 404 to request removal of faulty devices from service, and to restore those devices once any problems have been corrected. Finally, Fault Management may interface with a fault history database 405 that includes the status of the current fault state of each device, as well as the last fault isolated to each device.

As indicated, the system described above is an exemplary system, and the inventive aspect of the fault management system as described below may be implemented in such a system, or in any fault management system having a similar architecture.

The fault management system of the present invention includes a system and method for filtering fault reports, thereby overcoming the above-described disadvantages of known systems in which all detected faults are reported and addressed.

In one embodiment of the present invention, fault reports are filtered by allowing each card, either an application card or unit controller card, to report only the first fault of a given type, i.e., a data, path, or device fault, that is received. The card is then precluded from issuing subsequent fault reports of that type until instructed otherwise by Fault Management. In one embodiment, each card will include multiple "latched fault" flags, each one of which corresponds to a different fault type. The status of these flags represent the card's "latched fault status." When a particular latched fault flag is set, it indicates that a fault of the corresponding fault type has occurred since the last time the flag was reset. Once any of these flags have been set, this status will be maintained on the card until the card is instructed to clear the flag by Fault Management, such as after Fault Management has isolated and corrected the problem that caused the fault report to be generated. Further, once a latched fault flag has been set, the application card software will cause all subsequent fault reports relating to that fault type to be suppressed until the latched fault flag is cleared, thereby ensuring that only the first fault of a given type is reported and subsequently addressed by Fault Management. The fault management system may interrogate any card at any time as to its latched fault status by examining the status of the latched fault flags, thereby providing an additional way in which to isolate faults.

Figure 5:
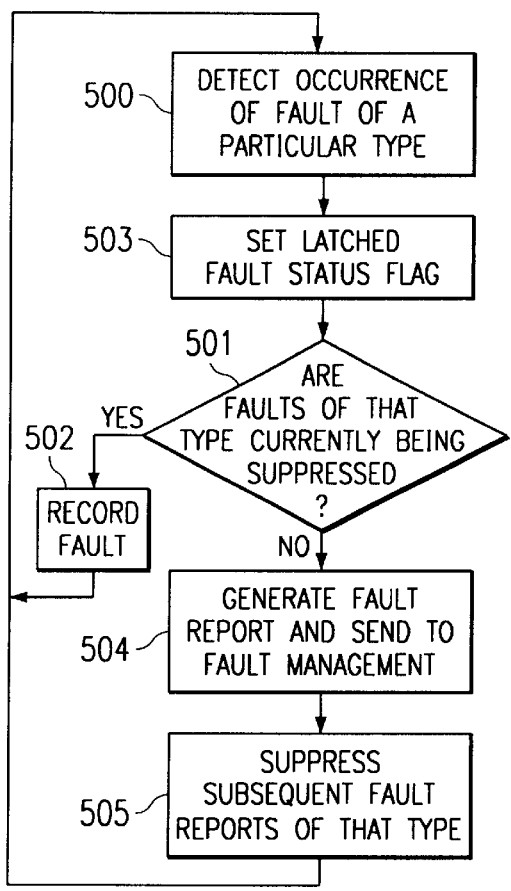
FIG. 5 is a flow chart illustrating fault report filtering by fault type.

FIG. 5 illustrates an exemplary procedure by which an application card may filter fault reports of a specified type to make the fault management system of the present invention more efficient and more reliable. Although described in conjunction with a particular type of fault, it is to be understood that the procedure described below applies independently to monitoring faults of all types.

In step 500, the application card detects the occurrence of a particular type of fault, such as a data fault. This may be achieved, for example, by either periodically monitoring the status of a detection device or circuit, or by receiving a signal, such as an interrupt signal, in response to the detection of a fault by the detection device. Once detected, the card will set the latched fault status flag in step 503 and then determine in step 501 whether fault reports of that type are currently being suppressed. As described above, fault reports of that type will be suppressed if a fault of that type was previously detected and reported, and the appropriate latched fault status flag is still set. If such fault reports are currently being suppressed, the card will wait until another fault is detected, and then return to step 500. In one embodiment, however, before returning to wait until another fault is detected, the fault will be recorded in step 502 for record keeping purposes, but will not be forwarded to Fault Management for the purpose of being acted upon by Fault Management. If fault reports of that type are not currently being suppressed, the card will proceed in step 504 to generate a fault report and forward it to Fault Management. The application card software will then proceed to suppress the generation of subsequent fault reports in step 505, and will continue to suppress these fault reports until it has been instructed to clear the latched fault status flag by Fault Management. It should be understood that latched fault status flag may also be set either after the fault report has been generated, or after the appropriate steps have been taken to suppress the generation of subsequent reports. When an instruction to clear the latched fault status flag is received from Fault Management, the specified flag will be cleared and the application card software will reenable fault report generation for fault reports relating to the corresponding type of fault. Thus, once reenabled, on a subsequent pass through the steps of FIG. 5, when the next fault of that type is detected, the application card will determine in step 502 that fault reports are not currently being suppressed, and will proceed to generate a fault report for that fault.

Figure 6:
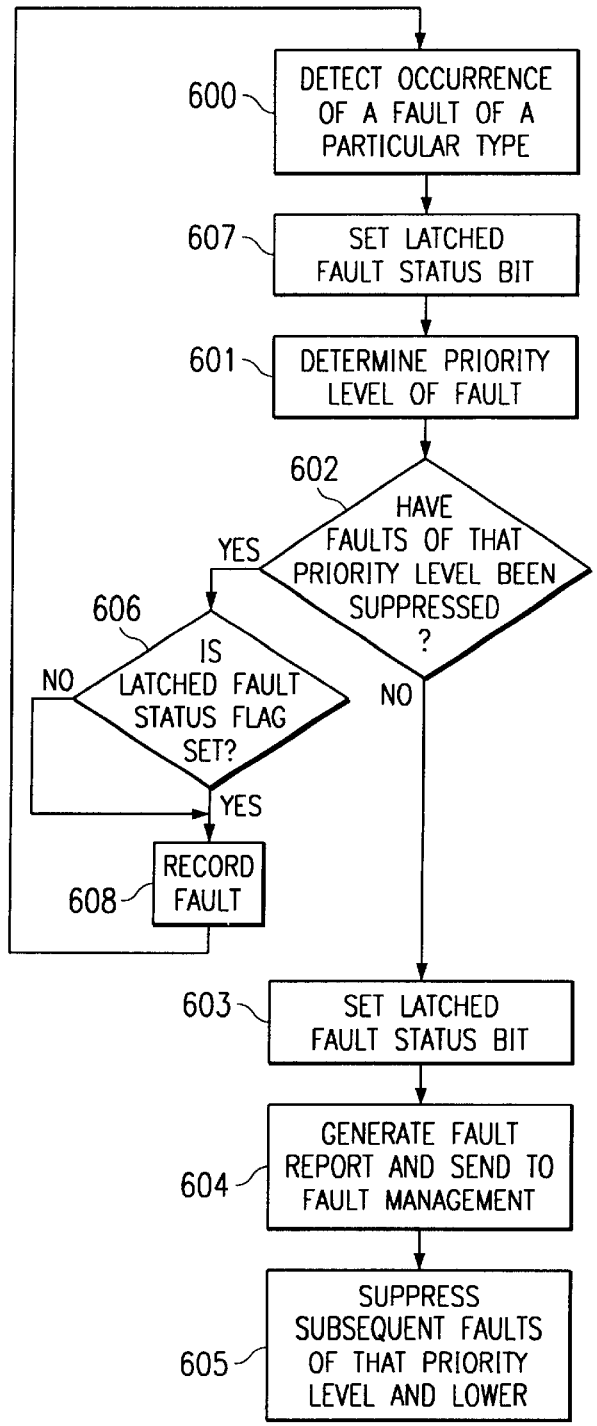
FIG. 6 is a flow chart illustrating fault report filtering by fault priority level.

In an alternate embodiment of the present invention, the types of faults may also be prioritized to allow more critical higher priority faults to be addressed first. For example, data faults may be considered more critical than timing faults, and thus assigned a higher priority in the fault management system. In this embodiment, as shown in FIG. 6, in response to detecting that a fault of a particular type has occurred in step 600, the latch fault status flag is set in step 607 followed by the determination of the priority level of that fault in step 601. Once the priority is determined, in step 602 it will be determined whether or not fault reports of that priority level have been suppressed. If they have not been suppressed, then the appropriate latched fault status flag is set in step 603, a fault report is generated in step 604, and subsequent fault report generation for fault reports relating to faults of that priority level and lower priority levels will then be suppressed in step 605. In a similar manner to that described above for filtering fault reports by type, fault reports of the appropriate priority level will be suppressed until the application card receives an instruction from Fault Management to clear the appropriate latched fault status flag, at which time the flag will be cleared and fault report generation will be reenabled for the corresponding fault priority levels. Once reenabled, on a subsequent pass through the steps of FIG. 6, the determination made at step 603 will result in a report being generated for the next occurring fault.

In one embodiment, if at step 602, it is determined that fault reports for that fault level are currently being suppressed, the application card software will determine whether the latched fault status flag for that fault type has been set in step 606 and, if not, it will record the fault in step 608. This is done to ensure that the latched fault status flag accurately reflects whether each type of fault has occurred since the last time the flags were cleared. Since fault reports of a given priority level and lower may be suppressed in this embodiment, the fact that one type of fault will not be reported will not necessarily mean that that type of fault has, in fact, occurred. Thus, by performing steps 606 and 608, although a fault report will not be generated and forwarded to Fault Management, the fault will be recorded and the state of the latched fault status flag will accurately reflect whether faults of the various types have actually occurred since the last time these flags were monitored by the fault management system.

The system and method for filtering faults described above with respect to application cards apply equally well at the unit controller level. Unit controllers 8 may similarly filter fault reports by, for example, processing and generating a fault report for only the first path fault received from the application cards, or for the first fault of a given priority level that is received. Further, at the highest level the fault management system will act only on the first fault of a designated type or priority level that is reported. Thus, the present invention, by introducing fault report filtering at each level, will enable the fault management system to more efficiently isolate and address faults by focusing on faults that are more likely to be at the root of the problem, rather than those that likely have resulted from or have been spawned by initial faults. Other modifications of the invention described above will be obvious to those skilled in the art, and it is intended that the scope of the invention be limited only as set forth in the appended claims.

What is claimed is:

1. A method for managing faults in a data transmission system, said data transmission system including a data transmission path for transmitting signals containing data, and a plurality of application cards along said data path for processing said signals, comprising the steps of:

detecting an occurrence of a first fault of a particular type at one of a plurality of detection points along said data transmission path;

in response to detecting said first fault of said particular type, one of said application cards generating a fault report for the purpose of identifying the cause of said detected fault; and preventing generation by said application card of subsequent fault reports relating to said particular type of fault until receiving a signal indicating that fault report generation may be reenabled.

2. The method according to claim 1, further comprising the steps of:

said application card receiving said signal indicating that fault report generation may be reenabled, and in response, reenabling fault report generation; and said application card generating a subsequent fault report in response to detection of a subsequent fault of said particular type.

3. The method for managing faults according to claim 2, further comprising the steps of:

in response to detecting said first fault of said particular type, setting a fault status indicator associated with said application card that represents said particular fault type; and in response to receiving said signal indicating that fault report generation may be reenabled, clearing said fault status indicator.

4. The method according to claim 3, wherein said data transmission system further includes a control unit for controlling said application cards, said unit controller including unit controller software, said method further comprising the step of sending said fault report to a fault manager subroutine of said unit controller software, said signal indicating that fault report generation may be reenabled being received from said fault manager.

5. The method according to claim 3, wherein said data transmission system further includes a unit controller for controlling said application cards, and a system manager for controlling said unit controller, said system manager including system manager software, said method further comprising the step of sending said fault report to a fault manager subroutine of said system manager software, said signal indicating that fault report generation may be reenabled being received from said fault manager.

6. The method according to claim 2, wherein said detected fault is a path fault.

7. The method according to claim 2, wherein said detected fault is a device fault.

8. The method according to claim 2, wherein said detected fault is a timing fault.

9. A method for managing faults in a data transmission system, said data transmission system including a data path for transmitting signals containing data, and a plurality of application cards along said data path for processing said signals, comprising the steps of:

detecting an occurrence of a first fault of a particular type at one of plurality of detection points along said data transmission path;

determining a priority level of said detected fault;

in response to detecting said first fault of said particular type, one of plurality of said application cards generating a fault report for the purpose of identifying the cause of said detected fault;

preventing generation by said application card of subsequent fault reports relating to faults of said determined priority level or lower until receiving a signal indicating that fault report generation may be reenabled.

10. The method according to claim 9, further comprising the steps of:

said application card receiving said signal, and in response, reenabling fault report generation; and said application card generating a subsequent fault report in response to detection of a subsequent fault of said determined priority level or lower.

11. The method for managing faults according to claim 10, further comprising the steps of:

in response to detection of said fault of said particular type, setting a fault status indicator associated with said application card that represents said particular fault type; and in response to receiving said signal indicating that fault report generation may be reenabled, clearing said fault status indicator.

12. The method according to claim 11, further comprising the step of sending said fault report to a fault manager within said data transmission system, wherein said signal indicating that fault report generation may be reenabled is received from said fault manager.

13. A method for managing faults in data transmission system, said data transmission system including a data path for transmitting signals containing data, and a plurality of application cards along said data path for processing said signals, comprising the steps of:

detecting an occurrence of a first fault of a particular type at one of plurality of detection points along said data transmission path;

in response to detecting said fault of said particular type, determining whether fault reports relating to said particular fault type are being suppressed;

if fault reports of said particular type are being suppressed, then waiting until another fault occurs and then returning to the detecting step;

if fault reports of said particular type are not being suppressed, then setting a fault status indicator associated with said application card that represents said particular fault type;

said application card generating a fault report for the purpose of identifying the cause of said detected fault;

preventing generation by said application card of subsequent fault reports relating to said particular fault type until receiving a signal indicating that fault report generation may be reenabled; and waiting until another fault occurs and then returning to the detecting step.

14. The method according to claim 13, further comprising the steps of:

said application card receiving said signal indicating that fault report generation should be reenabled, and in response, reenabling said fault report generation; and said application card generating a subsequent fault report in response to detection of a subsequent fault of said particular type.

15. The method according to claim 14, further comprising the step of sending said fault report to a fault manager within said data transmission system, wherein said signal indicating that fault report generation may be reenabled is received from said fault manager.

16. A fault management system for managing faults in a data transmission system, said data transmission system including a data transmission path for transmitting signals containing data, a plurality of application cards along said data path for processing said signals, at least one unit controller for controlling said application cards, and at least one system manager for controlling said at least one unit controller, said system comprising:

an application card software residing on said plurality of application cards;

a unit controller software residing on said at least one unit controller; and a system manager software residing on said at least one system manager, said application card software being capable of generating a first fault report in response to detecting that a first fault of a particular type has occurred in the data transmission system, and suppressing the generation of subsequent fault reports relating to said particular type of fault until receiving a signal indicating that fault report generation may be reenabled.

17. The system according to claim 16, wherein said fault report is sent to a fault management subroutine within said unit controller software, and wherein said signal indicating that fault report generation may be reenabled is received from said fault manager.

18. The system according to claim 16, wherein said fault report is sent to a fault management subroutine within said system manager software, and wherein said signal indicating that fault report generation may be reenabled is received from said fault manager.

* * * * *